US005077972A

United States Patent [19]

Bianchetta et al.

[11] Patent Number: 5,077,972

[45] Date of Patent: Jan. 7, 1992

[54] LOAD PRESSURE DUPLICATING CIRCUIT

[75] Inventors: Donald L. Bianchetta, Coal City; Gene R. St. Germain, Plainfield, both of Ill.

[73] Assignee: Caterpillar Inc., Peoria, Ill.

[21] Appl. No.: 548,341

[22] Filed: Jul. 3, 1990

[51] Int. Cl.[5] .............................................. F16D 31/02

[52] U.S. Cl. ........................................ 60/427; 60/450

[58] Field of Search .................. 60/450, 452, 426, 427

[56] References Cited

U.S. PATENT DOCUMENTS

| | | | |
|---|---|---|---|
| 3,878,679 | 4/1975 | Sievenpiper | 60/450 |
| 3,987,623 | 10/1976 | Bianchetta | 60/452 |
| 3,987,626 | 10/1976 | Bianchetta | 60/452 |
| 4,354,420 | 10/1982 | Bianchetta | 60/426 |
| 4,426,194 | 1/1984 | Pollman | 60/452 |
| 4,642,984 | 2/1987 | Dixen | 60/452 |
| 4,693,272 | 9/1987 | Wilke | 137/596 |
| 4,719,753 | 1/1988 | Kropp | 60/445 |
| 4,779,419 | 10/1988 | Crosser | 60/452 |
| 4,813,235 | 3/1989 | Miller | 60/452 |

FOREIGN PATENT DOCUMENTS

| | | |
|---|---|---|
| 2143975 | 2/1973 | France . |
| 2548290 | 1/1985 | France . |

OTHER PUBLICATIONS

SAE Technical Paper No. 891941, dated Sep. 11-14, 1989 and entitled "The Synchro Control System for Mobile Applications", by Herbert Seelman, W. Germany.

*Primary Examiner*—Edward K. Look
*Assistant Examiner*—F. Daniel Lopez
*Attorney, Agent, or Firm*—John W. Grant

[57] ABSTRACT

Load sensing hydraulic systems are useful for distributing fluid from a variable displacement pump to the individual work circuits in accordance with the demand of each work circuit. Preventing load pressure from being drained from the motors of the work circuits during some operating functions heretofore required the use of a pair of pressure compensating valves and a pair of shuttle valves at each of the directional control valves. The subject load pressure duplicating circuit includes a single load pressure duplicating valve having an end subjected to the load pressure in a signal network and reduces pump pressure entering the valve to a pressure level at the output thereof equal to the load pressure. This duplicated pressure is then utilized as the control fluid for the pressure compensating valves and a displacement controller of the pump. The system is greatly simplified by the use of only a single duplicating valve for a hydraulic system having a plurality of work circuits.

4 Claims, 1 Drawing Sheet

LOAD PRESSURE DUPLICATING CIRCUIT

TECHNICAL FIELD

This invention relates generally to a pressure responsive hydraulic system and more particularly to a load pressure duplicating circuit thereof which provides a duplicated pressure signal for controlling pressure responsive components of the system.

BACKGROUND ART

Load sensing hydraulic systems use load generated pressure to control pump displacement and some pressure compensating valve functions. The fluid used for such control functions is usually exhausted to the tank through control orifices or pressure regulating valves. Typically, the load pressure is connected to a load pressure signal network through a signal flow path of a directional control valve when the directional control valve is moved to an operating position to direct fluid from the pump to a hydraulic motor. Using load generated pressurized fluid for those control functions can result in load drift under some operating conditions. For example, many industrial or earthmoving vehicles have two or more moveable components controlled by hydraulic motors. Some of those components are arranged such that movement of one component can induce in the hydraulic motor connected to another component a load generated pressure greater than the pressure capacity of the pump. If the directional control valve associated with the motor having such load generated pressure therein is moved to an operating position, pressurized fluid from the motor could flow through the load signal flow path of the directional control valve and be lost across the load signal relief valve.

One arrangement for solving that problem is disclosed in an SAE Technical Paper No. 891941 dated Sept. 11-13, 1989 and entitled "The Synchro Control System For Mobile Applications" which shows a pair of pressure compensating valves integrally disposed in bores of a main valve spool of a directional control valve with each of the pressure compensating valves having a shuttle valve integrally positioned therein. The shuttle valve provides a dual function of either directing the load pressure signal of a particular work circuit directly to the associated pressure compensated valve if that work circuit has the highest load pressure or for directing a pressure signal from another work circuit to the pressure compensating valve if the load pressure of the associated work circuit is lower than the load pressure of another of the work circuits. However, that valve is very complex and would be expensive to manufacture since that system requires a pair of pressure compensating valves and a pair of shuttle valves associated with every one of the directional control valves. The valve arrangement disclosed in the above-noted SAE paper is also disclosed in U.S. Pat. No. 4,719,753.

The present invention is directed to overcoming one or more of the problems set forth above.

DISCLOSURE OF THE INVENTION

In one aspect of the present invention, a load pressure duplicating circuit is provided for a pressure responsive hydraulic system having a plurality of work circuits and a load sensing variable displacement pump connected to the work circuits in a parallel flow relationship and having a discharge port and a pressure responsive displacement controller. Each of the work circuits has a hydraulic motor, a directional control valve connected to the discharge port of the pump and to the hydraulic motor and having a variable metering orifice adapted to control the fluid flow from the pump to the motor, and a pressure compensating valve disposed in series flow relationship with the metering orifice. The duplicating circuit includes a load pressure signal network operatively connected to all the motors and having a control pressure line which receives the highest load pressure occurring at the motors, and a single pressure duplicating valve having an inlet port connected to the pump discharge port of the pump upstream of the metering orifice, an outlet port connected to the displacement controller, a first end connected to the control pressure line and a second end connected to the outlet port and being subjected to the fluid pressure therein. The first and second ends have the same effective working area. The duplicating valve is movable by the opposing forces acting on the first and second ends thereof to an operating position at which the pressure level of the fluid in the outlet port equals the pressure level of the load pressure in the control line.

In another aspect of the present invention, a load pressure duplicating circuit is provided for a pressure responsive hydraulic system having a hydraulic motor, a load sensing variable displacement pump having a discharge port and a pressure responsive displacement controller, and a directional control valve connected to the discharge port and to the motor and having a variable metering orifice adapted to control the fluid flow from the pump to the motor. The load pressure duplicating circuit includes a load pressure signal network operatively connected to the motor and having a control pressure line which receives the load pressure occurring at the motor. A single pressure duplicating valve has an inlet port connected to the discharge port of the pump upstream of the metering orifice, an outlet port connected to the displacement controller, a first end connected to the pressure line, and a second end connected to the outlet port and being subjected to the fluid pressure therein. The first and second ends have the same effective working area. The duplicating valve is movable by the opposing forces acting on the first and second ends thereof to an operating position at which the pressure level of the fluid in the outlet port equals the pressure level of the load pressure in the control line.

The present invention solves the problem of load drift by using a load pressure duplicating valve to duplicate the highest load pressure of the hydraulic system and using the duplicated signal for all the control functions of the system requiring a load pressure.

BEST MODE FOR CARRYING OUT THE INVENTION

Figure 1:
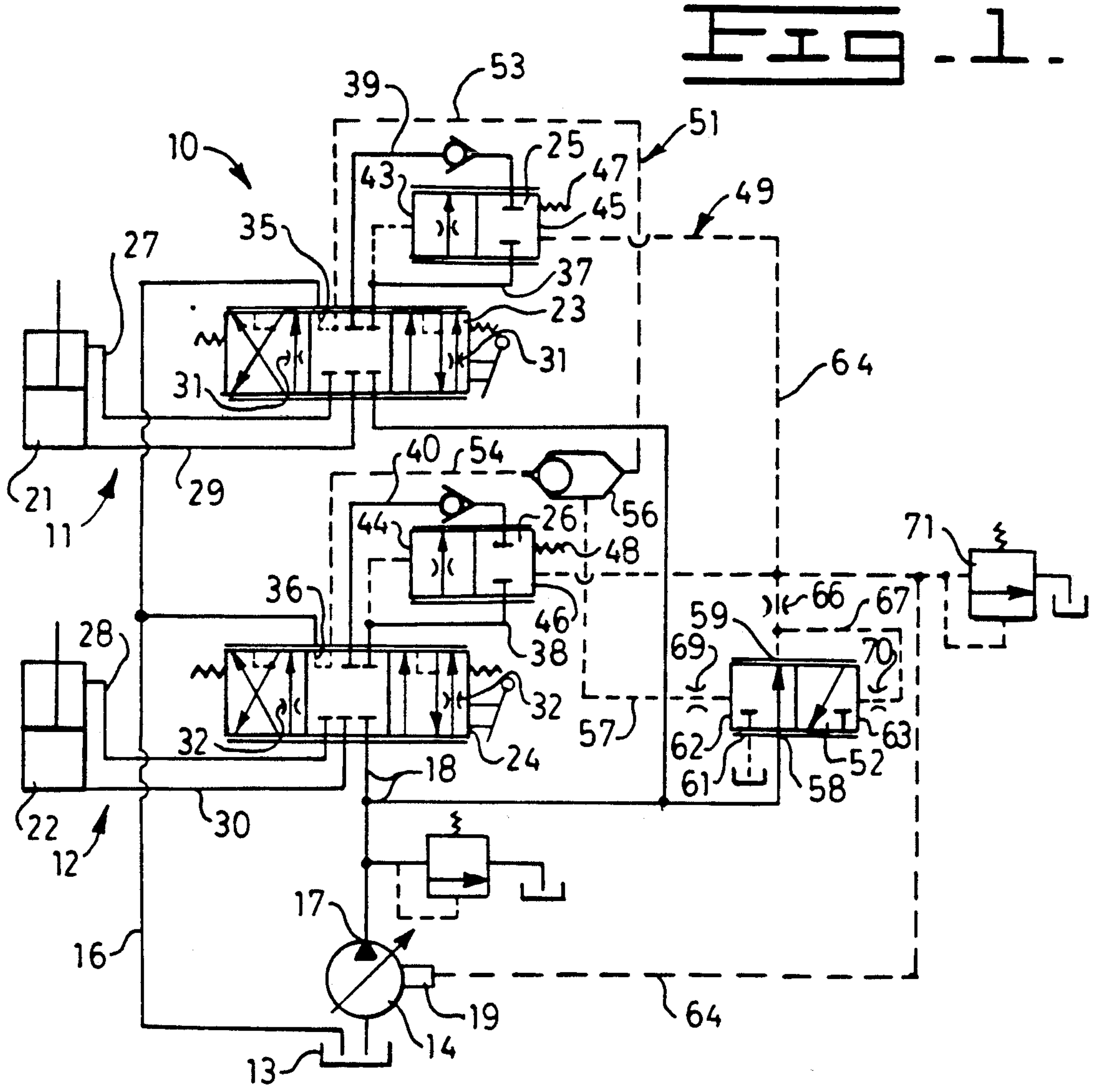
FIGS. 1 and 2 are schematic illustrations of embodiments of the present invention.

Referring to FIG. 1 of the drawings, a pressure responsive hydraulic system 10 includes a pair of work circuits 11,12, a tank 13, a load sensing variable displacement pump 14 connected to the tank 13, and an exhaust conduit 16 connected to the tank 13 and both of the work circuits 11,12. The pump 14 has a discharge port 17 connected to the work circuits 11,12 in a parallel flow relationship through a common supply conduit 18.

The pump includes a pressure responsive displacement controller 19 for controlling fluid flow through the discharge port 17 and supply conduit 18.

The work circuits 11,12 are substantially identical and thus only the work circuit 11 will be described in detail with the corresponding elements in the work circuit 12 having the next consecutive reference numeral. The work circuit 11 includes a double-acting hydraulic motor 21, a directional control valve 23, and a pressure compensating valve 25. The directional control valve 23 is connected to the supply conduit 18, the exhaust conduit 16, and to the hydraulic motor 21 through a pair of motor conduits 27,29. The directional control valve 23 has a pair of infinitely variable metering orifices 31 and a load pressure signal passage 35. The pressure compensating valve 25 is disposed downstream of the metering orifice 31 of the directional control valve 23 and is connected thereto through a transfer passage 37 to receive fluid passing through the metering orifice 31 of the directional control valve 23. The downstream side of the pressure compensating valve 25 is connected back to the directional control valve 23 through a return passage 39. The pressure compensating valve has opposite ends 43,45 and a spring 47 disposed at the end 45. The transfer passage 37 is connected to the end 43.

A load pressure duplicating circuit 49 includes a load pressure signal network 51 and a single load pressure duplicating valve 52. The signal network 51 is operatively connectable to both the hydraulic motors 21,22 and includes a pair of load pressure signal lines 53,54 connected to the signal passages 35,36 and to a resolver 56 which in turn is connected to a control pressure line 57.

The signal duplicating valve 52 has an inlet port 58, an outlet port 59, an exhaust port 61, and opposite ends 62,63 which have the same effective working area. The inlet port 58 is connected to the supply conduit 18 upstream of the metering orifices 31,32 while the exhaust port 61 is connected to the tank 13. The outlet port 59 is connected to the ends 45,46 of both of the pressure compensating valves 25,26, and to the displacement controller 19 of the pump 14 through a common signal line 64 having a control orifice 66 disposed therein. A pilot line 67 is connected to the signal line 64 upstream of the orifice 66 and to the end 63 of the duplicating valve 52. The control pressure line 57 is connected to the end 62 of the duplicating valve. A pair of dampening orifices 69,70 are disposed in the control line 57 and the pilot line 67 respectively. A load signal pressure relief valve 71 is connected to the signal line 64 downstream of the control orifice 66.

The pressure compensating valve 25 is moveable between a closed position at which the transfer passage 37 is blocked from the return passage 39 and an open infinitely variable operating position at which communication between the transfer passage 37 and the return passage 39 is controllably modulated. The pressure compensating valve 26 is similarly moveable to comparable positions.

Figure 2:
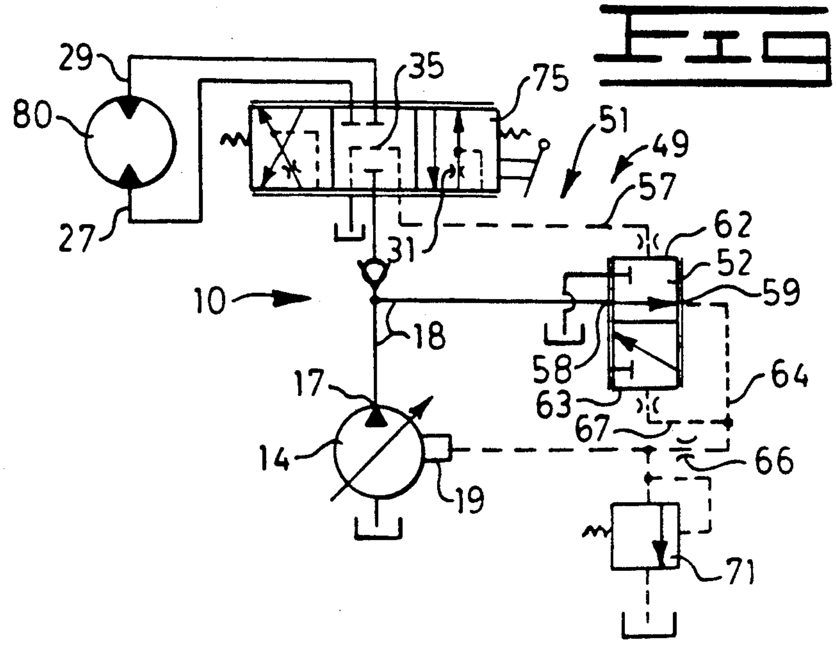

Another embodiment of a load pressure duplicating circuit 49 of the present invention is disclosed in FIG. 2. It is noted that the same reference numerals of the first embodiment are used to designate similarly constructed counterpart elements in this embodiment. In this embodiment, however, a pressure duplicating valve 52 is used in combination with a single function hydraulic system 10 not having a pressure compensating valve therein. The hydraulic system includes a supply conduit 18 connecting a discharge port 17 of a variable displacement load sensing pump 14 to a directional control valve 75 and an inlet port 58 of the duplicating valve 52. The directional control valve in turn is connected to a rotary motor 80 through motor conduits 27,29. A load pressure signal passage 35 located downstream of a metering orifice 31 of the directional control valve is connected directly to a control pressure line 57 connected to an end 62 of the duplicating valve 52. A signal line 64 connects an outlet port 59 of the duplicating valve to a displacement controller 19 of the pump 14.

The load pressure duplicating circuit 49 can also be used in combination with the more conventional pressure compensated, load sensing hydraulic system having the pressure compensating valves disposed upstream of the metering orifices of the control valves in a series flow relationship. However, the signal line 64 would be isolated from the pressure compensating valves and the duplicated pressure would be directed only to the directional controller of the pump.

INDUSTRIAL APPLICABILITY

In the use of the FIG. 1 embodiment of the present invention, the operator can actuate one or both of the hydraulic motors 21,22 by manipulating the appropriate directional control valve 23,24. For example, if the operator wishes to extend the hydraulic motor 21, the directional control valve 23 is moved leftwardly to pass fluid from the supply conduit 18 through the metering orifice 31 and into the transfer passage 37 in a series flow relationship. Initially, the pressurized fluid in the passage 37 acts on the end 43 of the pressure compensating valve 25 moving it rightwardly to the operating position so fluid can pass therethrough to the return passage 39 where it passes through the directional control valve into the motor conduit 29 and the motor 21. The quantity or flow rate of the fluid passing through the above-described flow path is determined by the metering orifice 31. With the directional control valve at the leftward position, the load pressure signal passage 35 is in communication with the motor conduit 29 and thus directs a load pressure signal through the signal line 53 and the resolver valve 56 and into the control pressure line 57. The load pressure in the control pressure line 57 acts on the end of the duplicating valve 63 so that it momentarily assumes the position shown in the drawing and fluid from the supply conduit 18 passes therethrough and into the common signal line 64. The fluid pressure in the signal line 64 passes through the pilot line 67 where it exerts a force on the end 63 of the duplicating valve 52 tending to move the duplicating valve leftwardly. The signal duplicating valve functions somewhat like a pressure reducing valve by reducing the pressure level of the discharge fluid from the pump 14 to a level determined by the load pressure in the control line 57. More specifically, with the ends 62 and 63 having the same effective working area, the signal duplicating valve is moved by the opposing forces acting on the ends thereof to an intermediate operating position at which the fluid pressure in the outlet port 59 and the signal line 64 is equal to the load pressure in the line 57. The fluid pressure in the control signal line 64 is simultaneously transmitted to the ends 45,46 of the pressure compensating valves 25,26 and to the displacement controller 19 of the pump 14. The pump is immediately stroked to a displacement position at which the pump discharge pressure in the supply conduit 18 is at a predetermined level greater than the load pressure in the motor conduit 29. This pressure differential is commonly called the margin pressure. The pressure acting on the end 45 of the pressure compensating valve 25 acts in concert with the spring 47 to position the pressure compensating valve 25 at a position at which the pressure drop across the pressure compensating valve is essentially equal to the value of the spring 47. If the control valve 23 is the only valve at an operating position, the displacement controller 19 will maintain the margin pressure substantially constant regardless of the load being exerted on the hydraulic motor 21 and the pressure compensating valve has essentially no effect on the fluid passing therethrough.

If the operator wishes to extend the motor 22 while the motor 21 is extending, the directional control valve 24 is moved leftwardly to an operating position resulting in flow being directed to the motor conduit 30 similar to that described above.

Assuming now that the load acting on the motor 22 is greater than the load on the motor 21. Under this condition, the load pressure in the signal passage 36 will be the highest load pressure and is thus transmitted to the control line 57 of the load signal network 51. The duplicating valve 52 shifts accordingly so that the pressure in the control line 64 is equal to that highest load pressure. The higher duplicated pressure in the control signal line 64 is simultaneously transmitted to the ends 45,46 of the pressure compensating valves 25,26 and to the displacement controller 19 of the pump 14. The pressure compensating valves function in the usual manner in cooperation with the displacement controller 19 to maintain the desired pressure differentials across the metering orifices 31,32 so that the desired flow rates thereacross are achieved. If the combined demand for fluid from the work circuits is greater than the output of the pump, the pressure compensating valves proportion the flow according to the size of the orifices 31,32.

Now assume that the combined extension of the hydraulic motors 21,22 causes an induced load pressure in the hydraulic motor 22 sufficient for it to stall. Under this condition, the relief valve 71 opens and cooperates with the control orifice 66 to maintain the control pressure in the control line 64 at a level that would permit the pump to continue to operate so that the motor 21 would continue to receive fluid.

In the above condition, it can be readily recognized that the actual load pressure in the signal network 51 is isolated from the flow path necessary to maintain system operation and thus no fluid would be drained from the motor 22 through the signal network 51.

In the use of the embodiment of FIG. 2, rotation of the rotary motor 80 is initiated by moving the directional control valve 75 leftwardly to an operating position at which pressurized fluid from the supply conduit 18 passes through the metering orifice 31 and into the motor conduit 29. The load pressure in the conduit 29 is transmitted through the load pressure signal passage 35 and the control line 57 to the end 62 of the duplicating valve 52. The duplicating valve functions in the manner described above so that a duplicated signal equivalent to the load pressure in the pressure line 57 is present in the signal line 64. The displacement controller 19 reacts to the duplicated signal and strokes the pump to a displacement position at which the pump discharge pressure in the supply conduit 18 is at a predetermined level greater than the load pressure in the motor conduit 29.

In view of the foregoing, it is readily apparent that the structure of the present invention provides an improved load pressure duplicating circuit which isolates the actual load pressures from the flow path commonly used for system control. Moreover, the system is uncomplicated in that only a single duplicating valve is used for a plurality of work circuits with each work circuit having only a single pressure compensating valve.

Other aspects, objects, and advantages of this invention can be obtained from a study of the drawings, the disclosure, and the appended claims.

We claim:

1. A load pressure duplicating circuit for a pressure responsive hydraulic system having a plurality of work circuits, and a load sensing variable displacement pump connected to the work circuits in a parallel flow relationship and having a discharge port and a pressure responsive displacement controller, each of the work circuits having a hydraulic motor, a directional control valve connected to the discharge port and to the motor and having a variable metering orifice adapted to control the fluid flow from the pump to the motor, and a single pressure compensating valve disposed in series flow relationship with the metering orifice wherein each of the pressure compensating valves is moveable between open and closed positions and has an end, and a spring disposed at the end biasing the pressure compensating valve toward one of the open and the closed positions, said duplicating circuit comprising:

a load pressure signal network operatively connected to all the motors and having a control pressure line which receives the highest load pressure occurring at the motors; and a single pressure duplicating valve having an inlet port connected to the pump discharge port of the pump upstream of the metering orifice, an outlet port connected to the displacement controller, a first end connected to the control pressure line and a second end connected to the outlet port and being subjected to the fluid pressure therein, said first and second ends having the same effective working area, said duplicating valve being moveable by the opposing forces acting on the first and second ends thereof to an operating position at which the pressure level of the fluid in the outlet port equals the pressure level of the load pressure in the control line, the end of each pressure compensating valve being connected to the outlet port of the duplicating valve.

2. The duplicating circuit of claim 1 wherein the load pressure is isolated from the ends of the pressure compensating valves and from the displacement controller.

3. The duplicating circuit of claim 1 wherein the pressure compensating valves are disposed downstream of the metering orifices and the springs bias the pressure compensating valves toward the closed positions.

4. A load pressure duplicating circuit for a pressure responsive hydraulic system having a plurality of work circuits, and a pump connected to the work circuits in a parallel flow relationship, each of the work circuits having a hydraulic motor, a directional control valve connected to the discharge port and to the motor and having a variable metering orifice adapted to control the fluid flow from the pump to the motor, and a single pressure compensating valve disposed in series flow relationship with the metering orifice and being moveable between open and closed positions and having a spring disposed at one end thereof biasing the pressure compensating valve toward one of the open and closed positions, said duplicating circuit comprising:

a load pressure signal network operatively connected to all the motors and having a control pressure line which receives the highest load pressure occurring at the motors; and a single pressure duplicating valve having an inlet port connected to the pump, an outlet port, a first end connected to the control pressure line and a second end connected to the outlet port and being subjected to the fluid pressure therein, said first and second ends having the same effective working area, said duplicating valve being moveable by the opposing forces acting on the first and second ends thereof to an operating position at which the pressure level of the fluid in the outlet port equals the pressure level of the load pressure in the control line, the end of each pressure compensating valve being connected to the outlet port of the duplicating valve.

* * * * *